(12) United States Patent
MacKay

(10) Patent No.: US 7,116,070 B2
(45) Date of Patent: Oct. 3, 2006

(54) SYSTEM AND METHOD FOR SENSOR LESS MAGNETIC FIELD CONTROL OF A MOTOR

(75) Inventor: David Kyle MacKay, Oakville (CA)

(73) Assignee: Agile Systems Inc., Waterloo (CA)

( * ) Notice: Subject to any disclaimer, the term of this patent is extended or adjusted under 35 U.S.C. 154(b) by 0 days.

(21) Appl. No.: 11/181,947

(22) Filed: Jul. 15, 2005

(65) Prior Publication Data

US 2006/0038517 A1 Feb. 23, 2006

Related U.S. Application Data

(60) Provisional application No. 60/603,287, filed on Aug. 23, 2004.

(51) Int. Cl.
*H02P 7/06* (2006.01)

(52) U.S. Cl. .................. 318/254; 318/138; 318/439; 318/685; 318/696; 318/700

(58) Field of Classification Search .............. 318/138, 318/439, 254, 700, 685, 696
See application file for complete search history.

(56) References Cited

U.S. PATENT DOCUMENTS

| | | | |
|---|---|---|---|
| 4,480,218 A * | 10/1984 | Hair ........................ 318/696 |
| 4,926,105 A | 5/1990 | Mischenko et al. |
| 5,034,668 A | 7/1991 | Bausch |
| 5,202,613 A * | 4/1993 | Kruse ....................... 318/254 |
| 5,227,709 A | 7/1993 | Gauthier et al. |
| 5,339,012 A | 8/1994 | Schroedl |
| 5,384,527 A | 1/1995 | Rozman et al. |
| 5,656,911 A | 8/1997 | Nakayama et al. |
| 5,726,549 A | 3/1998 | Okuno et al. |
| 5,796,231 A | 8/1998 | Kyodo |
| 5,903,129 A | 5/1999 | Okuno et al. |
| 6,008,618 A | 12/1999 | Bose et al. |
| 6,081,091 A | 6/2000 | Mitchell et al. |
| 6,335,605 B1 | 1/2002 | Negoro |
| 6,552,509 B1 | 4/2003 | Veltman |
| 6,555,988 B1 | 4/2003 | Masaki et al. |
| 6,686,714 B1 | 2/2004 | Trifilo |
| 6,707,265 B1 | 3/2004 | Imai et al. |
| 6,806,675 B1 * | 10/2004 | Wang et al. ............. 318/685 |
| 2001/0043048 A1 | 11/2001 | Tajima et al. |
| 2002/0074962 A1 | 6/2002 | Moddemann |
| 2003/0155877 A1 | 8/2003 | Barrenscheen et al. |
| 2003/0222612 A1 | 12/2003 | Matsushita |
| 2004/0062062 A1 | 4/2004 | Lee et al. |

FOREIGN PATENT DOCUMENTS

DE 4001769 A1 * 7/1991

* cited by examiner

*Primary Examiner*—Lincoln Donovan
*Assistant Examiner*—Tyrone Smith
(74) *Attorney, Agent, or Firm*—McCarthy Tetrault LLP

(57) ABSTRACT

A system and method for sensor less control of a stepper motor is described. The system and method includes estimation of the position of a rotor of the motor by way of sensing circuitry on the windings of the motor, without the use of positional sensors. The system and method of stepper motor control further includes magnetic field optimization for increasing the torque generating component of a magnetic field generated by stators of the motor, and magnetic field weakening for countering some of the effects of back electromotive force generated by the magnetic rotor.

19 Claims, 12 Drawing Sheets

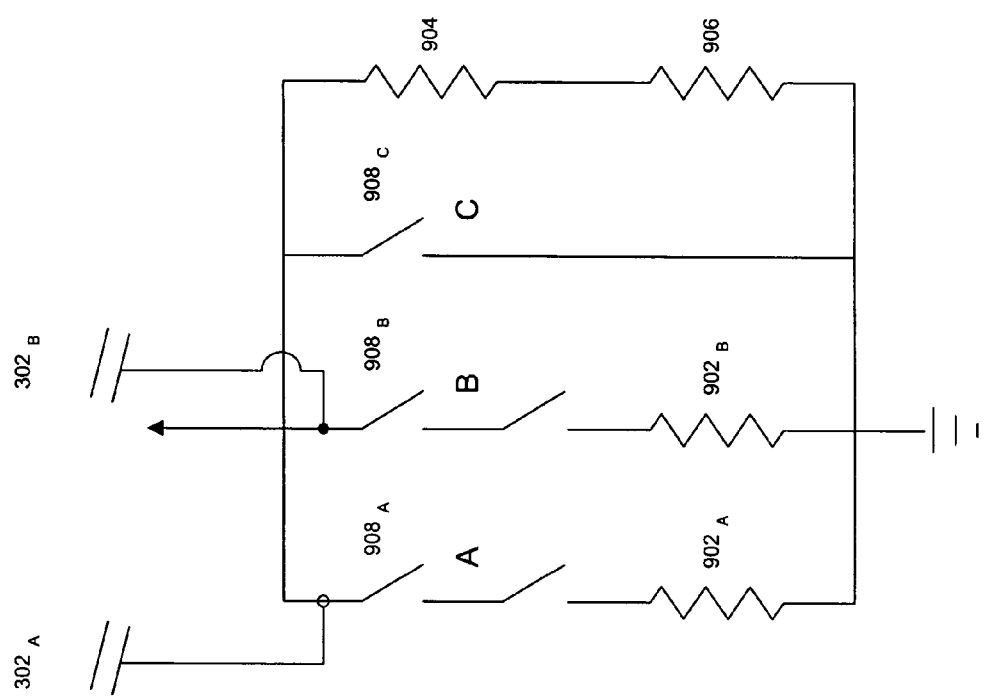

SYSTEM AND METHOD FOR SENSOR LESS MAGNETIC FIELD CONTROL OF A MOTOR

This application claims the benefit of U.S. Provisional Application No. 60/603,287, filed Aug. 23, 2004.

FIELD OF INVENTION

The present invention relates to a system and method for sensor less magnetic field control of a motor, such as a stepper motor.

BACKGROUND OF THE INVENTION

A motor may operate without any position feedback and rely on a motor's inherent characteristics to control the position of the rotor by energizing particular stators of the motor. This manner of motor operation may typically be found in stepper motors, wherein the rotor of a motor rotates by a specific number of degrees in response to input electrical signals to energize particular stators of such motors.

Stepper motors typically convert digital pulse inputs to analog output rotor movement. Typically, in response to an input pulse of electrical signal, the rotor of a stepper motor rotates by a design-specified number of degrees, or a step. Stepper motors are typically classified as permanent magnet, variable reluctance, or hybrid. A permanent magnet stepper motor typically has as its rotor a permanent magnet, whereas a variable reluctance stepper motor may have a toothed block of a magnetically soft (or ferromagnetic) rotor. A hybrid stepper motor has typically an axial permanent magnet at the middle of the rotor and ferromagnetic "teeth" at the outer portion of the rotor.

Operating stepper motors without any position feedback may cause problems in situations where the rotor "lags" behind the intended rotor position by being a number of steps, or in steps being "lost" and never recovered if the rotor lags behind the intended position too much. Lagging may occur, for example, if a rotor is attached to a large load and the acceleration force of the motor is too low to rotate the rotor fast enough to respond to a control input signal before a next input signal is received. Further, without any positional feedback, resonance problems may occur leading to a "stall" condition, such as when the magnetic field created by the stators of the motor is such that it holds the rotor in place rather than rotating it, cannot be detected and corrected by a motor controller. Additionally, even if resonance does not lead to a stall conditions, undesirable oscillations would result from the resonance.

Positional feedback sensors may be incorporated into a motor to monitor the position of the rotor optically, but such systems may be complicated to install and maintain, and furthermore may require substantially more control circuitry or software modules to implement.

There is a need for a system and method for obtaining feedback information and controlling motor operation without using positional feedback sensors.

The operation of an electromagnetic motor is typically via the generation of one or more electromagnetic fields that operate to cause rotation of a rotor of the motor. There is a need for a system and method for controlling the electromagnetic fields generated in an electromagnetic motor to improve performance.

SUMMARY OF THE INVENTION

In an aspect of the present invention, a method for controlling a position of a magnetic rotor of an electric motor is provided. The motor may have a plurality of stators for causing rotation of the rotor upon magnetization of at least one stator of the plurality of stators, and a winding connected to each stator of the plurality of stators for magnetizing said each stator when electric current flows through the winding. The motor being responsive to current control signals to direct electric current to flow through one or more of the windings to cause the rotor to rotate towards an intended position. The method comprises determining a present position of the rotor based on at least one of current and voltage conditions of the windings, and adjusting the current control signals based on any difference between said present position and the intended position of the rotor to cause an adjustment in the electric current flowing through the winding, to cause the rotor to rotate toward the intended position from the present position.

The determining of the present position may include deriving a present electrical phase representing the present position of the rotor from the at least one of current and voltage conditions, and deriving a present rotor velocity from the at least one of current and voltage conditions.

The current control signals may be initially generated from input control signals. The input control signals may include a position setpoint and a velocity setpoint. The position setpoint being the intended position, and the adjusting the current control signals may include deriving an intended electrical phase from the position setpoint; generating a phase error based on any difference between the present electrical phase and the intended electrical phase, generating a first velocity adjustment from the phase error; generating a second velocity adjustment based on any difference between the present rotor velocity and the velocity setpoint; adjusting the velocity setpoint by the first and second velocity adjustments; and using the adjusted velocity setpoint to adjust the current control signals.

Upon generation of a stator magnetic field by magnetizing one or more of the plurality of stators for causing rotation of the rotor, the stator magnetic field has a quadrature component along a quadrature axis and a direct component along a direct axis relative to the present position of the rotor, and the adjusting the current control signals may include determining one or more of the at least one windings to energize for tending to reduce the direct component of the stator magnetic field; determining one or more of the at least one windings to energize for tending to increase the quadrature component of the stator magnetic field; and further adjusting the current control signals to provide current to the one or more of said at least one windings in accordance with the determining of windings to energize for tending to reduce the direct component and in accordance with the determining of windings to energize for tending to increase the quadrature component.

The determining a present position of the rotor may include determining a back electromotive force induced over each winding connected to each stator of the plurality of stators from the at least one of current and voltage conditions of the windings, whereby the present position of the rotor may be determined from the back electromotive force.

The further adjusting the current control signals may include determining a direct component of a back electromotive force field along the direct axis based on the back electromotive force induced over each winding; determining one or more of the at least one windings to energize for generating a rotor weakening field to oppose the direct component of the back electromotive force field; and further adjusting the current control signals to provide current to the one or more of the at least one windings in accordance with the determining of windings to energize for generating a rotor weakening field.

The motor may be a stepper motor or a brushless DC motor. The windings of the motor may be connected to a three half-bridges drive circuit or to a two full-bridges drive circuit.

The steps of observing current and voltage conditions, determining a present position of the rotor, and adjusting the input control signals may be repeated for tracking and adjusting the present position relative to the intended position of the rotor.

In another aspect of the invention, a system for controlling the position of a magnetic rotor of an electric motor is provided. The motor may have a plurality of stators for causing rotation of the rotor upon magnetization of at least one stator of the plurality of stators, and a winding connected to each stator for magnetizing each stator when electric current flows through the winding. The motor responds to current control signals to adjust electric current flowing through one or more of said windings to cause the rotor to rotate towards an intended position. The system comprises a sampling circuit electrically connected to each winding for measuring at least one of the current and voltage on each winding and a processing circuit in communication with the sampling circuit for determining a present position of the rotor from the at least one of current and voltage on each winding. The processing circuit receives input control signals and adjusts the input control signals to generate adjusted control signals based on any difference between the present position and the intended position of the rotor. The processing circuit being in communication with the motor to cause an adjustment in the current control signals to cause the rotor to rotate toward the intended position based on the adjusted input control signals.

The processing circuit may additionally determine the present velocity of the rotor based on the present position of the rotor at two or more distinct points in time.

The input control signals of the system may comprise a position setpoint and velocity setpoint. The position setpoint being the intended position. The processing circuit may determine an intended electrical phase from the position setpoint; determine a present electrical phase from the present position of the rotor; generate a phase error based on any difference between the present electrical phase and the intended electrical phase; generates a first velocity adjustment from the phase error; generate a second velocity adjustment based on any difference between the present rotor velocity and the velocity setpoint; adjust the velocity setpoint by the first and second velocity adjustments to generate an adjusted velocity setpoint; and using the adjusted velocity setpoint to adjust the current control signals.

Upon generation of a stator magnetic field by magnetizing one or more of the plurality of stators for causing rotation of the rotor, the stator magnetic field has a quadrature component along a quadrature axis and a direct component along a direct axis relative to the present position of the rotor. The processing circuit may further determine a first commutation adjustment for energizing one or more of the at least one windings for tending to reduce the direct component of said stator magnetic field; determine a second commutation adjustment for energizing one or more of the at least one windings to for tending to increase the quadrature component of the stator magnetic field; and further adjust the current control signals to provide current to the one or more of said at least one windings in accordance with the first and second commutation adjustments.

The processing circuit may further determine a back electromotive force induced over each winding connected to each stator of the plurality of stators from the at least one of current and voltage conditions of the windings, whereby the processing circuit determines the present position of the rotor from the back electromotive force.

The processing circuit may further determine a direct component of a back electromotive force field along the direct axis based on said back electromotive force induced over each winding; determine a third commutation adjustment for energizing one or more of the at least one windings for generating a rotor weakening field to oppose the direct component of the back electromotive force field; and further adjusts the current control signals to provide current to the one or more of the at least one windings in accordance with the third commutation adjustment.

The motor controller may report a fault condition if a phase error or position error exceeds certain user specified limits.

The motor controller may switch from open loop mode to phase locked loop (or closed loop) mode and back again at a threshold speed. These transitions may be performed with minimal torque disturbance an with no position loss. The motor controller may continually track and accumulate any position related errors and recover the errors when load and speed conditions permit.

The determining of a present position of the rotor may include integrating values of previously determined back electromotive force induced over each winding, and the integrating may include, at a time of transition to a closed loop operation, seeding integration constant for the integrating with values determined from the back electromotive force at the time of transition.

The method may further comprise: determining an intended electrical phase representing the intended position of the rotor; determining a difference between the intended electrical phase and present electrical phase as a phase error; and tracking the phase error in the event of a load connected to the rotor prevents the intended position from being immediately achieved. The method may further comprise providing an alert if the tracking the phase error detects a stall condition on the rotor. The time of transition may be selected based on the phase error.

The motor may be a stepper motor or a brushless DC motor. The windings of the motor may be connected to a three half-bridges drive circuit or a two full-bridges drive circuit.

The processing circuit may comprises at least one digital signal processor.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 9 is a schematic representation of a sampling circuit of the motor control scheme of FIG. 2.

DETAILED DESCRIPTION OF AN EMBODIMENT

Figure 1:
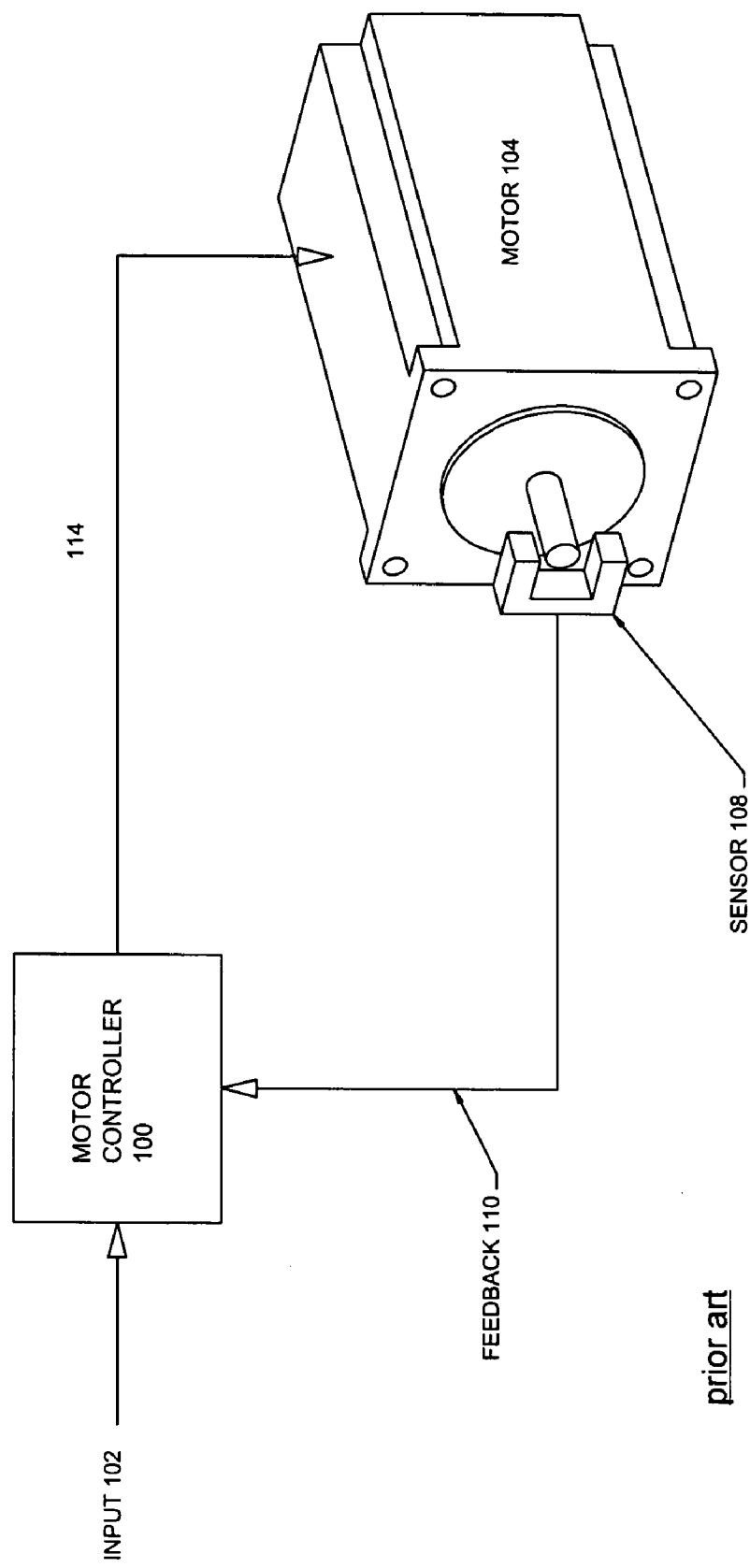
FIG. 1 is a block diagram of a prior art implementation of a motor control scheme using positional sensors.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

Referring to FIG. 1, a prior art motor controller 100 with sensor 108 providing position feedback is shown. In such an implementation, input signals 102 are provided to prior art motor controller 100, which then provides control signals 214 to motor 104, which then causes the "stepping" motion of rotor 106. Feedback in such a prior art implementation is provided by sensor 108, which may be an optical sensor, to determine the position of rotor 106. This feedback signal is then provided as feedback signals 110 to motor controller 100, which may then use the feedback signals 110 to determine if there are errors in the position of rotor 106, and then adjusts control signals 114 as appropriate in an attempt to correct the error in the position of rotor 106.

Figure 2:
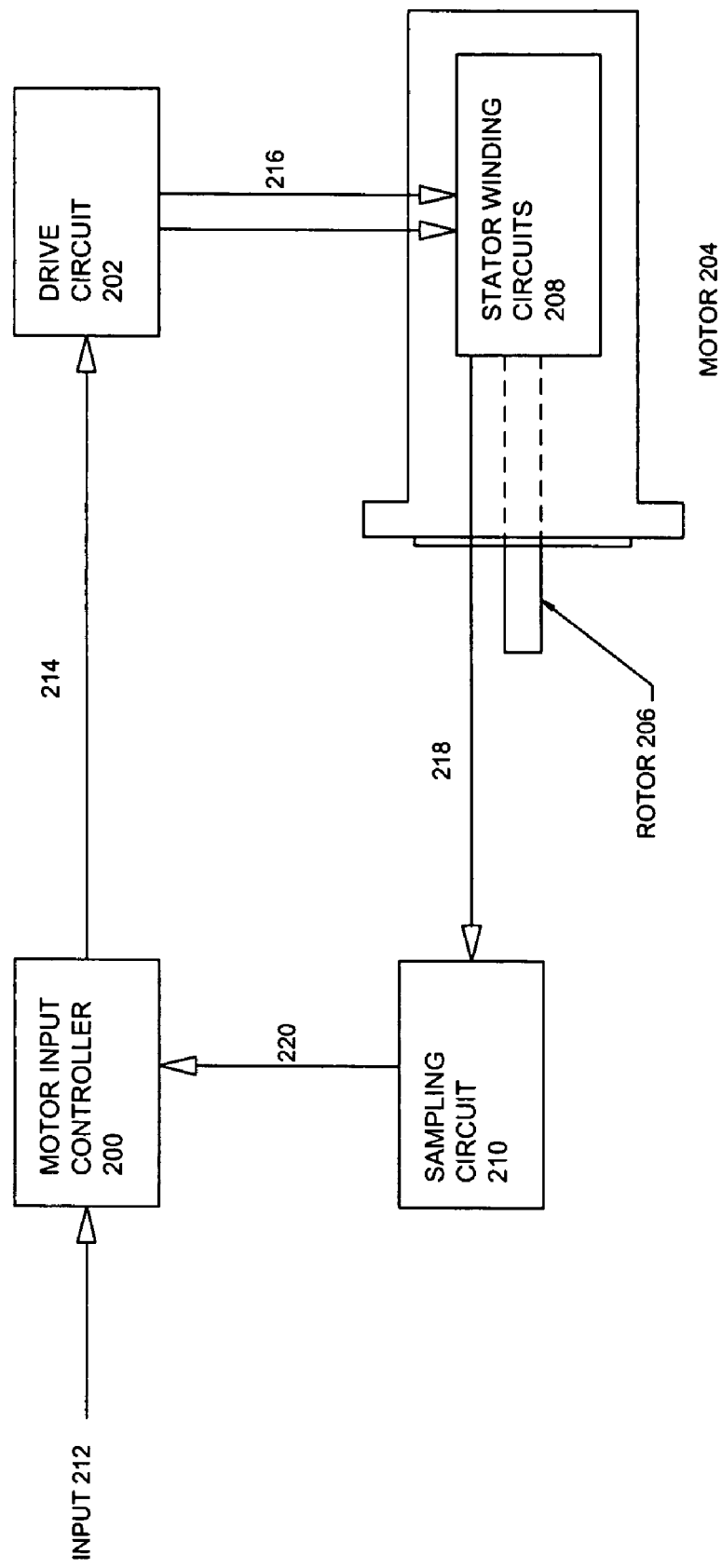
FIG. 2 is a block diagram of an embodiment of a motor control scheme for controlling a motor without a positional sensor.

Referring to FIG. 2, a block representation of an embodiment of the present invention, whereby the need for positional sensors is removed, is shown. In the embodiment, a motor input controller 200, which provides commutation control to drive circuit 202 connected to motor 204, is shown. In the embodiment, motor 204 includes a magnetic rotor 206. A magnetic rotor may typically be made of a permanent magnet material, or in the case of a hybrid permanent magnet-variable reluctance motor, be made of both permanent magnet and ferromagnetic materials.

Motor input controller 200 provides control signals 214, such as pulse width modulation (PWM) signals, to a drive circuit 202. The control signals 214 are generated by motor input controller 200 initially from input control signals 212, that for the embodiment is received from a host motor controller (not shown and discussed in greater detail below) which, among other things, specifies an intended position of rotor 206 of motor 204. Drive circuit 202 controls the provision of electrical current to motor 204. The electrical current 216 from drive circuit 202 is provided to stator winding circuits 208 of motor 204, which windings then magnetize one or more stators of motor 204 to generate a magnetic field which cause rotor 206 to rotate in motor 204, as is known in the art. A sampling circuit 210 is connected to the stator winding circuits 208 and motor input controller 200 to observe current and voltage conditions of stator winding circuits 208, and provide this information as feedback signals 220 to motor input controller 200. The position and velocity setpoints can also be derived within the motor input controller using the pulse and direction digital signals provided to the motor input controller Using the feedback information from sampling circuit 210, motor input controller 200 estimates the position of rotor 206 based on the current and voltage conditions of stator winding circuits 208. Motor input controller 200 then compares its estimate of the present position of rotor 206 with that of the intended position of the rotor, as determined from input control signals 212, and adjust its output control signal 214 in order to vary the duty cycle of the electrical voltage provided to motor 204 by drive circuit 202, such that the position of rotor 206 is encouraged towards the intended position. For example, if rotor 206 was lagging behind its intended position, motor input controller 200 may adjust output control signal 214 to cause increases in the duty cycles being provided to the stators of motor 204 to further accelerate rotor 206 towards the intended position based on input control signals 212. In the context of a stepper motor, this increase may translate to an increase in the stepping rate of motor 204, so as to cause motor 204 to increase the rotational velocity of rotor 206 so that the position of rotor 206 will catch up to its intended position.

In the embodiment, the need for a position feedback sensor to monitor the position of rotor 206 is removed by providing a sampling circuit 210. By connecting sampling circuit 210 to stator winding circuits 208 and generating feedback signals 220 therefrom, sampling circuit 210 allows motor input controller 200 to estimate the present position of rotor 206 based on the current and voltage conditions of stator winding circuits 208, as explained in greater detail below. In this manner, positional feedback of rotor 206 is provided in the embodiment without the need for a position sensor.

By using feedback signals 220, motor input controller 200, in connection with drive circuit 202, motor 204, and sampling circuit 210, may be analyzed and controlled in a manner analogous to a phase lock loop system such that the positional error of rotor 206, as compared to the intended position specified by input control signals 212, may be driven towards zero as the position of rotor 206 is "locked" onto the intended position specified by input control signals 212, as explained in greater detail below. Furthermore, the feedback signals permit estimations of the magnetic fields generated in motor 204 to be analyzed and controlled, as also explained in greater detail below.

For the embodiment, input control signals 212 is provided by a host computer that provides control of motor 204, such as by position, velocity and time ("PVT") information. For instance, a user may generate on the host computer a profile for motor 204 to, for example, control the position of rotor 206 at particular times. In the embodiment, this is accomplished by defining a number "counts" in one mechanical revolutions of rotor 206, and having a PVT table created for the profile to be used. The counts specifies the position of rotor 206 relative to a base position in a single direction along a revolution. For example, the PVT table may have three columns: one for position (in counts), one for velocity (in counts per millisecond) and one for time (in milliseconds). Each row of the PVT table may then be read by the host computer and continuously provided to motor input controller 200 as input control signals 212 by way of, for example, a serial communication link such as RS232 or RS485, at set intervals for a control loop rate, such as at every 50 us. Input control signals 212 having these position and velocity sets points are processed by motor input controller 200, as discussed in greater detail below, to provide control of rotor 206. To provide a more continuous acceleration profile for rotor 206, a third order polynomial interpolation may be performed on the PVT values received by motor input controller 200.

As described in greater detail below, for the embodiment motor input controller performs its control functions using frequency and phase information, with frequency being analogous to velocity and phase analogous to position. As such, motor input controller 200 also converts the PVT information to phase and frequency. For example, motor 206 would have a number of "steps", and for a defined number of "counts" in a revolution, the phase (in radians) and frequency (in radians per time period) may be determined as follows:

$$\frac{\text{Radians}}{\text{Count}} = \frac{2 \times \pi \times \text{Steps}/4)}{\text{Counts per Revolution}}$$

$$\text{Phase} = \text{MODULUS}\left(\frac{\text{position set point}}{\text{Counts per Revolution}}\right)\left(\frac{\text{Radians}}{\text{Count}}\right)$$

$$\text{Frequency} = \frac{\left(\frac{\text{Counts}}{\text{Second}}\right)\left(\frac{\text{Radians}}{\text{Count}}\right)}{\text{Time Period}}$$

where "time period" is a time value representing a control loop time, i.e., the frequency with which position and velocity set points are analyzed by motor input controller 200 (for example, a 20 kHz control loop will have a 50 us time period).

In an alternate embodiment, instead of having pre-generated PVT values provided from a host computer, velocity and position set points may also be derived for motor input controller 200 from input control signals 212 comprising two digital control signals; one being pulse signal and the other being a direction signal. For instance, one mechanical revolution of rotor 206 may be divided into a number of "pulses" (similarly to counts described above), and direction may be provided as a binary value indicating whether the desired movement is in the clockwise or anti-clockwise direction of rotation. Each pulse represents an indication to move rotor 206 in the direction specified for the rotational distance of the pulse. In this alternate embodiment, motor input controller includes a pulse counter that, in response to input control signals 212, is incremented or decremented once for each pulse received, depending on a whether the direction is "positive" or "negative", respectively. As any changes in the position of rotor 206 is desired, a pulse and direction signal may be generated externally to motor input controller 200 and sent thereto for recording in the pulse counter. The pulse counter is read and cleared by controller 200 at a set sampling rate, and the pulse counter information is used to generate position and velocity set point information representative of any change in desired position and velocity change in the sampling period. For example, at a sampling rate to 20 kHz, a new position set point at the time of sampling is the current position plus the pulse count maintained by the pulse counter, while the velocity set point is the pulse count divided by the sampling period, or 50 us in this example. It will be appreciated that in this alternate embodiment position, velocity and time information may still be generated by motor input controller even though input control signals 212 may comprise two digital signals for pulse and direction only. Use of this alternate input control signals 212 may be desirable in applications in which a host computer is avoided, and input control signals 212 are provided by a DSP that outputs only digital signals representing single step movements in a specified rotational direction. It will be appreciated that the output of "pulses" may be asynchronous with respect to the sampling rite of controller 200.

Figure 3:
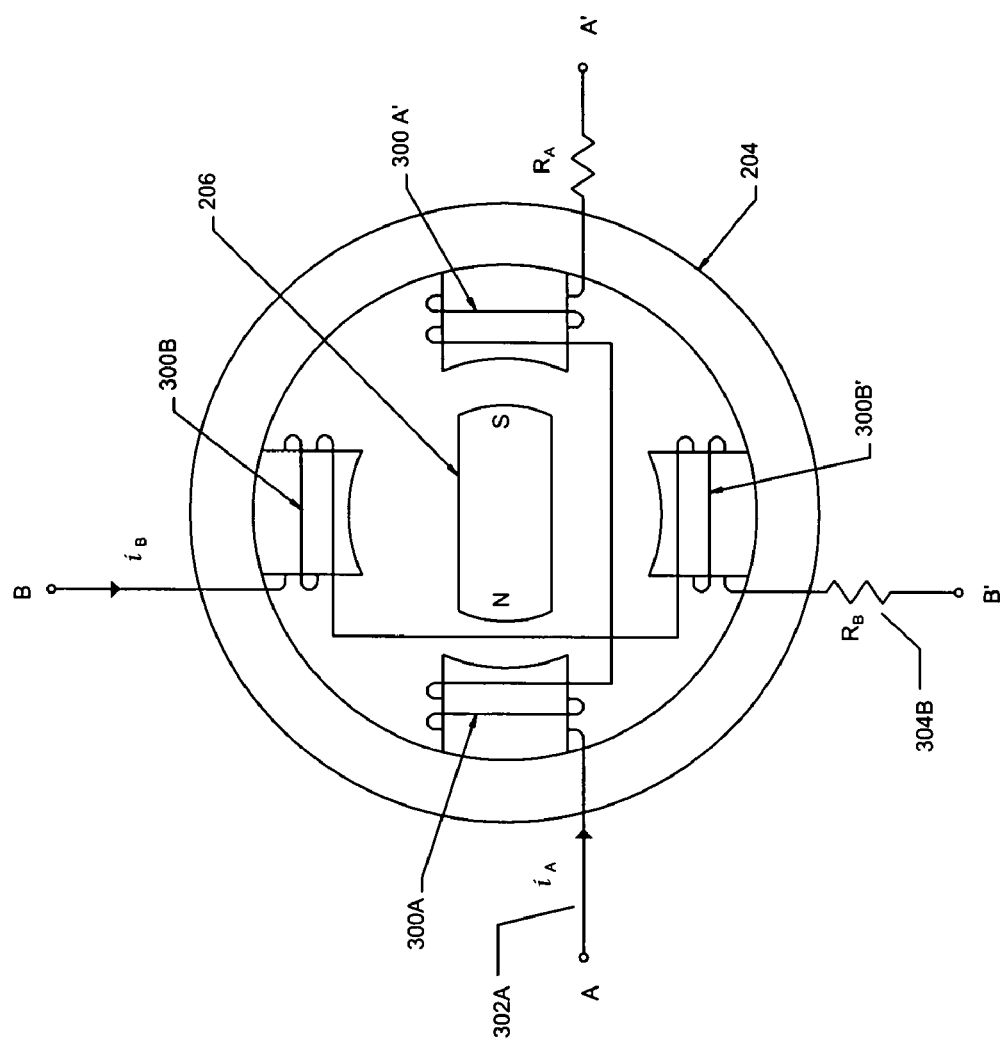
FIG. 3 is a cut away view of components of the motor of FIG. 2.
Figure 4:
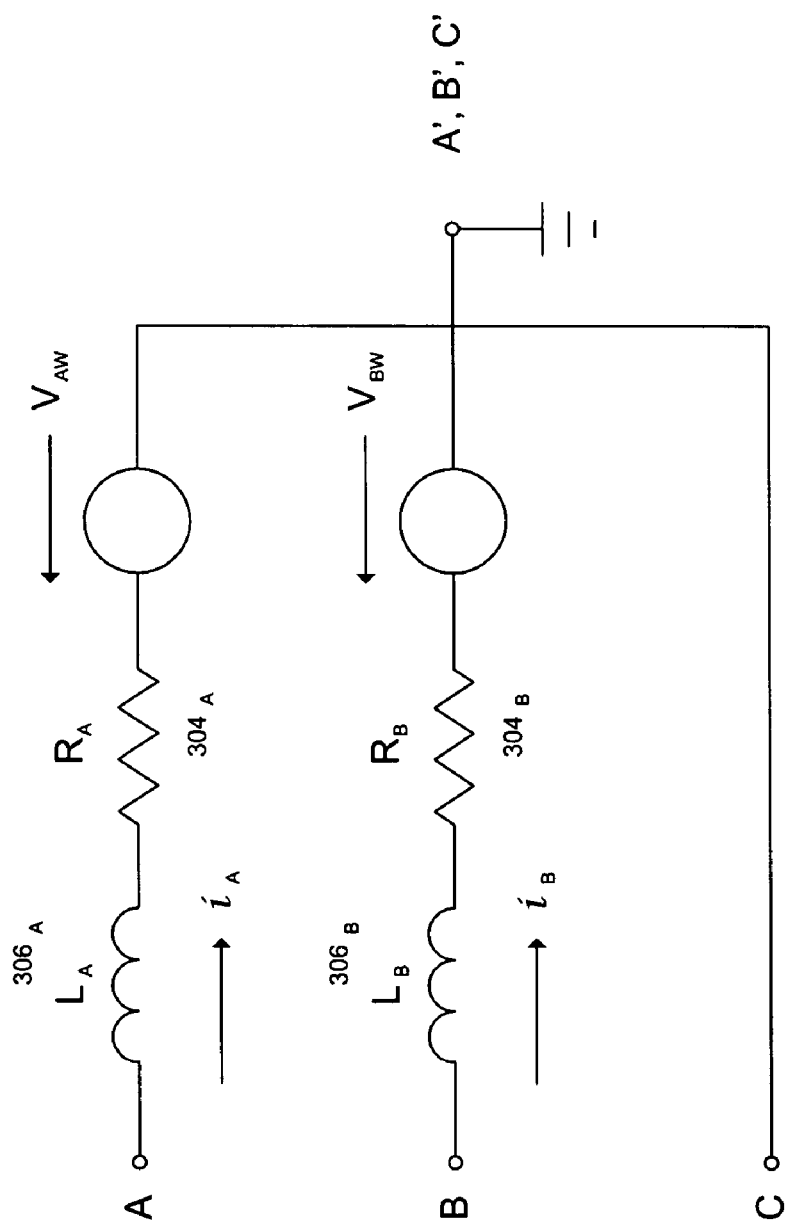
FIG. 4 is a electric schematic representation of the motor components of FIG. 3.

Referring to FIGS. 3 and 4, a detailed view of the relationship between rotor 206, stator winding circuits 208, and the stators of motor 204 is provided. In this example, motor 204 is shown as a two-phase permanent magnet stepper motor having two separate windings 302A and 302B. In FIG. 4, an electrical schematic representation of motor 204 connected to a drive circuit 202 having a three half-bridges configuration is shown. An example of a three half-bridges configuration drive circuit is described in greater detail below with reference to FIG. 8b. It will be appreciated that motors having additional stators and windings, or other configurations of drive circuits, may be used in other embodiments.

Referring to FIG. 3, motor 204 is shown to include stators 300A, 300A', 300B and 300B'. Rotor 206 has opposing magnetic poles 250 and 252 at its ends, shown as "N" (pole 250 for magnetic north) and "S" (pole 252 for magnetic south) respectively. As is known in the art, rotor 206 rotates in response to a magnetic field created by the energization of stators 300A, 300A', 300B and 300B' through stator winding circuits 208, which comprise windings 302A and 302B. As is known to those skilled in the art, a winding circuit around the stators of a motor can be analytically represented as an inductor. Thus, windings 302A and 302B are shown as inductors on the circuit diagram of FIG. 4.

The resistance of each winding 302A and 302B is represented on FIGS. 3 and 4 as resistors 304A and 304B. It will be appreciated that as winding 302A is energized by an electrical current from drive circuit 202, a magnetic field vector is produced in each of stators 300A and 300A'. Likewise, as winding 302B is energized, a magnetic field vector is produced in each of stators 300B and 300B'. It will also be appreciated that the direction and magnitude of the magnetic field vector produced by stators 300A is the same as that produced in stator 300A'. Further, it will be appreciated that the direction and magnitude of the fields for stators 300B and 300B' are likewise the same. Still further, it will be appreciated that by reversing the direction of current flow of windings in 302A and 302B, the direction of the magnetic field vectors produced in each pair of stators can be reversed.

As windings 302A and 302B are energized, it will further be appreciated that the magnetic field vectors produced by each stator, in the aggregate, form a magnetic field within motor 204 which will tend to cause rotor 206 to rotate. By varying the energizing of windings 302A and 302B and the direction of current flow in each winding, the magnetic field within motor 204 may also be varied so that rotor 206 may be rotated by a step, held in a particular position, or rotated continuously, as is known in the art.

The resistance and inductances of a motor 204 may be predetermined by performing tests upon motor 204, and such values may then be represented for analytical purposes as inductors 306A and 306B and resistors 304A and 304B as shown on the circuit diagram of FIG. 4. Since rotor 206 comprises a permanent magnet, a rotor magnetic field is also generated by rotor 206. This rotor magnetic field changes with the rotation of rotor 206 within motor 204, and it will be appreciated that this changing of magnetic field will induce an AC voltage in windings 302A and 302B. This induced AC voltage is referred to as the back electromotive force (EMF) because the voltage induced in each motor winding 302A and 302B is always in phase with and counter to the ideal magnetic field required to turn the rotor 206 in the same direction as that which is generating the back EMF. It will also be appreciated that both the frequency and amplitude of the EMF increases with greater rotor speed and therefore, the back EMF contributes to the decline in torque generated upon rotor 206 with increased stepping rate of motor 204. Referring to FIG. 4, it will be appreciated that when motor 204 is operating to rotate rotor 206, a back EMF $V_{AW}$ and $V_{BW}$ will be generated across each of windings 302A and 302B.

The estimation of the position of rotor 206 from feedback signals 220 is now considered with reference to FIG. 4. From observing the current and the voltage conditions of windings 302A and 302B, the embodiment estimates the position of rotor 206 by first calculating the back EMF generated by motor 204.

Using sampling circuit 210, the voltage across winding 302A, represented as $V_A$, the voltage across winding 302B, represented as $V_B$, and the DC link bus voltage $V_C$, are measured and provided to motor input controller 200 as part of feedback signals 220. Sampling circuit 210 also observes the electrical current in windings 302A and 302B, shown as $I_A$ and $I_B$, and provides such information to motor input controller 200 as part of feedback signals 220. In a preferred embodiment, sampling circuit 210 only monitors the DC link bus voltage $V_C$, and motor input controller 200 uses information regarding the PWM duty cycles of current being provided by drive circuit 202 to circuit windings 208, to derive the motor phase voltages $V_A$ and $V_B$. Since PWM duty cycles may be considered as a percentage from 0% to 100% of a time period when current is being supplied to a winding, it will be appreciated that the voltage across a particular winding may be calculated as the product of the PWM duty cycle for that winding multiplied by the DC link bus voltage. It will be appreciated that the motor phase voltages, currents and DC bus voltages may be determined by different methods or components in alternate embodiments.

From the circuit diagram of FIG. 4, it will be appreciated that at any instant in time the following equations represents the back EMF voltages $V_{AW}$ (across circuit winding 302A) and $V_{BW}$ (across circuit winding 302B):

$$V_{AW} = V_A - V_C - L_A \frac{di_A}{dt} - R_A i_A$$

$$V_{BW} = V_B - V_C - L_B \frac{di_B}{dt} - R_B i_B$$

For the embodiment, the time derivative of the current flowing through windings 302A or 302B is estimated by using a forward and backward difference scheme. In this scheme, the phase voltage at the same instant in time is approximated as an average of the terminal voltage over the same two cycles found around the current sampling point. For instance, the time derivative of the current and voltage at a moment in time "n" can be represented as follows:

$$\left.\frac{di}{dt}\right|_n = \frac{i_{n+1} - i_{n-1}}{2} \quad V\bigg|_n = \frac{V_{n-1} + V_{n+1}}{2}$$

As such, the discrete time equivalent of back EMF across windings 302A and 302B may be represented as follows:

$$V_{AW} = \frac{(V_{An-1} + V_{An+1})}{2} - \frac{V_C}{2} - L_A \frac{(i_{An+1} - i_{Bn-1})}{2} - R_A i_n$$

$$V_{BW} = \frac{(V_{Bn-1} + V_{Bn+1})}{2} - \frac{V_C}{2} - L_B \frac{(i_{An+1} - i_{An-1})}{2} - R_B i_n$$

The back EMF voltages corresponding to each winding 302A and 302B may then be integrated to yield a back EMF flux vector corresponding to each winding 302A and 302B, denoted as $\lambda_{AW}$ and $\lambda_{BW}$:

$$\lambda_{AW} = \int_o^n V_{AW} + C_a$$

$$\lambda_{BW} = \int_o^n V_{BW} + C_b$$

where $C_a$ and $C_b$ are integration constants representing the initial flux vector With these integrated values $\lambda_{AW}$ and $\lambda_{BW}$, the spatial position of rotor 206 can then be estimated as the arc-tangent of the ratio of $\lambda_{AW}$ to $\lambda_{BW}$. From the spatial position estimate, the velocity of rotor 206 is determined as the difference between the position of rotor 206 at time (n) and the position of rotor 206 at time (n+1). For the embodiment, the position of rotor 206 is estimated as an electrical phase that is from $-\pi$ to $+\pi$, and the velocity is estimated in radians/sec.

As such, it can be seen that positional feedback of rotor 206 may be achieved in the embodiment without the use of positional sensors. With the ability to estimate the present position and velocity of rotor 206, the control of the position of rotor 206 by motor input controller 200 is now considered.

As discussed above, for the embodiment, motor input controller 200 operates by receiving input control signals 212 that provides the intended position and rotational velocity of rotor 206 to motor input controller 200. Motor input controller 200 translates the position and velocity set-points provided by input signals 212 into pulse width modulation (PWM) signals to control the duty cycles of the electrical voltage to be provided by drive circuit 202 to stator winding circuits 208 to cause rotation of rotor 206. Such PWM signals are represented as current set-points for each of winding 302A and 302B of motor 204. Additionally, motor input controller 200 adjusts the current set-points of windings 302A and 302B to provide compensation to account for any differences between the intended position and velocity of rotor 206 to the estimated position and velocity that is determined from feedback signals 220. The current set-points, and hence the duty cycles of voltage provided to windings 302A and 202B, are continually adjusted by motor input controller 200 to cause rotor 206 to rotate in response to input signals 212 and to any required positional or velocity compensation.

Figure 5:
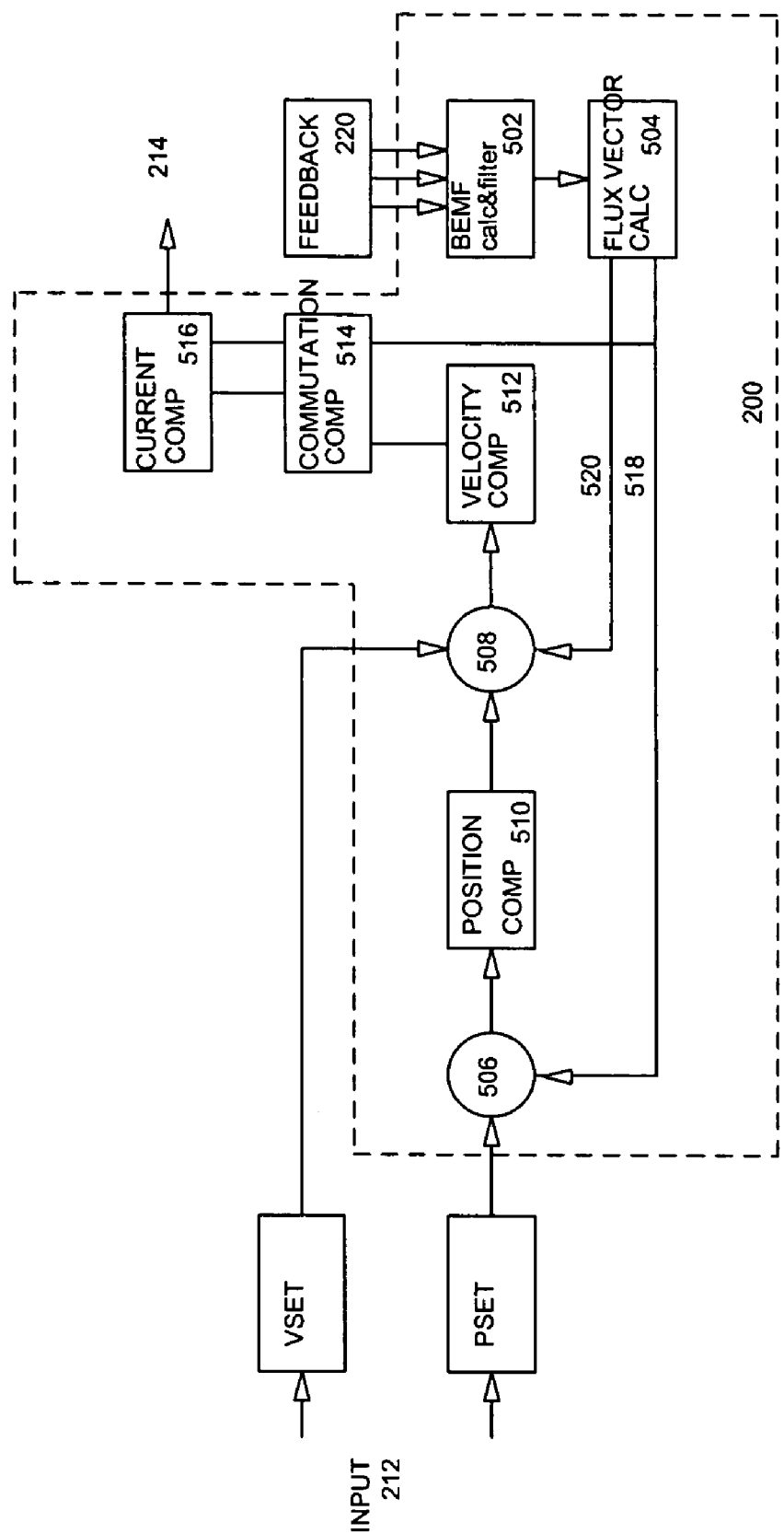
FIG. 5 is a block diagram of the motor control scheme of FIG. 2.
Figure 6:
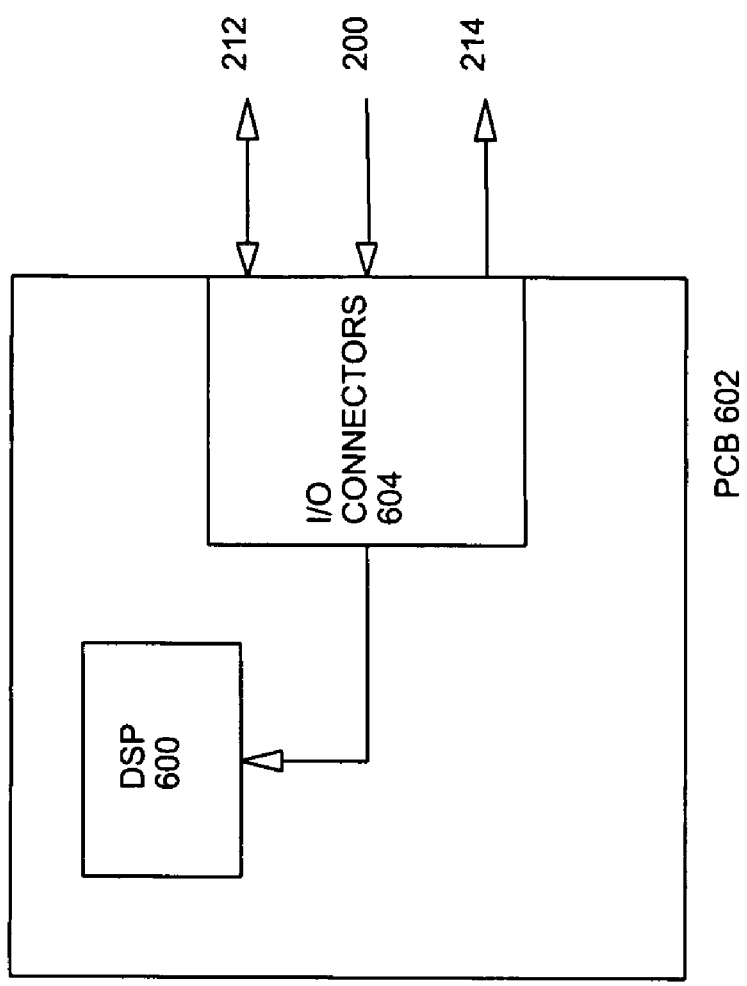
FIG. 6 is a block diagram of the components to a motor input controller of the motor control scheme of FIG. 2.

Referring to FIGS. 5 and 6, additional details of motor input controller 200 is provided. Referring to FIG. 6, motor input controller 200 comprises a digital signal processor (DSP) 600 mounted on a printed circuit board (PCB) 602. PCB 602 has I/O connectors 604 to receive input control signals 212 from a host motor controller (not shown), to receive feedback signals 200 from sampling circuit 210, and to provide control signals 214 to drive circuit 202. In another embodiment, the motor controller may also have digital inputs to receive signals from a pulse and direction signal source and storing such information in a pulse counter, as discussed above. It will be appreciated that in alternate embodiments, other processing circuits or combinations of components may be used to implement a functionally similar motor input controller. For example, DSP 600 may be replaced by two separate processors, such as with the ADMCF328 and ADSP2189 processors from Analog Devices, in an embodiment.

Referring to FIG. 5, a block diagram showing the various functions performed by DSP 600 of motor input controller 200 is provided. Motor input controller 200 performs a back EMF calculator function 502 to receive feedback signals 220 from sampling circuit 210 through I/O connectors 604, and to calculate the back EMF's $V_{AW}$ and $V_{BW}$, as described above. The $V_{AW}$ and $V_{BW}$ values are then provided to flux vector calculator function 504, whereby the discrete-time back EMF values $V_{AW}$ and $V_{BW}$ are integrated over time to obtain $\lambda_{AW}$ and $\lambda_{BW}$, as described above. Under open loop conditions, the back EMF signals may be filtered through a low pass filter (such as, for example, a 3 dB frequency filter at approximately 800 Hz). This filtering may be desirable to improve the signal-to-noise ration of the back EMF signal since these voltage signals are used for position estimation while in open loop. Also within flux vector calculator function 504, calculations are performed to determine the electrical phase position and velocity of rotor 206, as described above. The velocity estimate produced by the flux vector calculator function 504 may also be passed through a low pass filter (such as one with a 3 dB cutoff frequency at approximately 400 Hz). This filtered velocity may be used as the feedback for the velocity compensator.

The estimated position of rotor 206 is then provided to position comparator function 506. Position comparator function 506 examines the estimated present position of rotor 206 and compares this position to the intended position of rotor 206 as derived from input signal 212. The difference between the present position and intended position of rotor 206 as determine by position comparator function 506 is then provided to position compensator function 510, which determines a first velocity adjustment that is required to adjust the velocity of rotor 206 to urge the position of rotor 206 towards the intended position. This first velocity adjustment is provided as the output of position compensator 510.

The first velocity adjustment is then provided to velocity comparator function 508, which also receives the estimated velocity of rotor 206 from flux vector calculator function 504 and the intended velocity set-point from input signal 212. The difference between the estimated velocity and intended velocity of rotor 206 may be referred to as a second velocity adjustment. Velocity comparator function 508 examines the first and second velocity adjustments to determine the total compensation required, if any, to adjust for differences between the present and intended position and velocity of rotor 206. Velocity comparator function 508 performs this by taking the sum of these two the first velocity adjustment and the intended velocity set-point, and subtracting the estimated present velocity of rotor 206. The output is then provided to velocity compensator function 512, which then generates a adjusted velocity set-point to account for all three factors just described.

The adjusted velocity set-point is then provided to commutation control function 514, which converts the compensated velocity into current control signals set-points for each of windings 302A and 302B. These current set-points are then provided to current compensation function 510, which generates PWM current control voltages as the control signals 214 to drive circuit 202 and to vary the duty cycle of electrical current provided to windings 302A and 302B, so as to vary the rotation of rotor 206 in accordance with input signals 212 and the required position and velocity compensation as determined by motor input controller 200.

It will be appreciated that motor input controller 200 can continually estimate the present position and velocity of rotor 206, and provide continual adjustments to the current set-points for windings 302A and 302B so as to continually compensate for any discrepancies between the intended and estimated position and velocity of rotor 206. In steady-state operation, any discrepancies between the intended and estimated position and velocity of rotor 206 will be driven towards zero as motor input controller 200 continually adjusts the current set-points of windings 302A and 302B of motor 204.

Figure 7B:
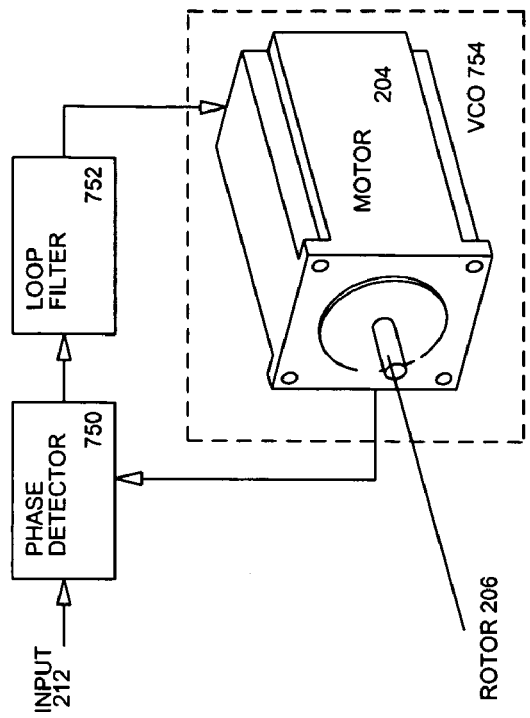
FIG. 7b is an alternate block diagram representation of the motor control scheme of FIG. 2.
Figure 7A:
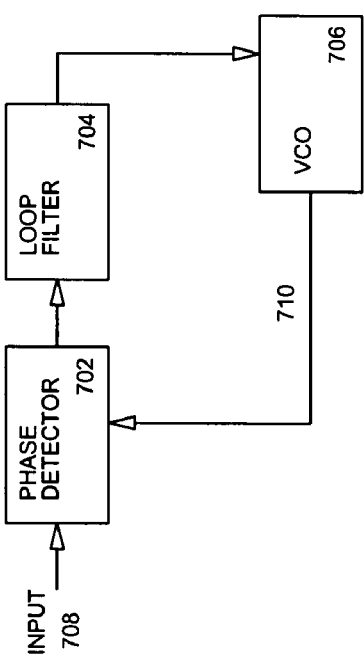
FIG. 7a is a block diagram representation of an electrical phase lock loop.

Analytically, this manner of motor control may be considered as a mechanical equivalent of an electrical phase-lock loop such that the position and velocity of rotor 206 is "locked" onto the intended position provided by input signal 212. Referring to FIG. 7a, a block diagram representation of an electronic phase-lock loop is shown. As is known in the art, electronic phase-lock loops typically operate by having an oscillator frequency produced by a voltage controlled oscillator (VCO) 706 to match and lock onto the frequency of an input signal 708. A phase detector 702 is typically provided to compare the frequency of the input signal 708 with the output of VCO 706 through feedback 710, and to adjust the phase in response to the input signal. A low-pass filter 704 is also typically provided to generate a correction voltage from the output of phase detector 702, which is provided to VCO 706 to adjust the oscillation frequency generated by VCO 706. This adjustment in oscillation frequency corrects any discrepancies between the frequency of input signals 708 and the oscillation frequency generated by VCO 706. In a "locked" condition, any change in the frequency of input signal 708 first appears as a change in phase between input signal 708 and the oscillation frequency of VCO 706. This change in phase is detected by phase detector 702, which notes the phase shift between the two signals. Such phase shifts are then be provided to loop filter 704 to generate a change in voltage signal which is then provided to VCO 706 to change the oscillation frequency to match the frequency of the input signal 706, and lock onto and track the input signal.

In the embodiment, the control scheme utilized by motor input controller 200 may be analyzed as a mechanical equivalent to an electrical phase lock loop. In operation, motor controller 200 may be analyzed as a phase lock loop by having the velocity of motor 206 mapped to frequency, and the rotor position mapped to phase. In the mechanical phase lock loop analytical model usable with the embodiment, the position set-point from input signal 212 is analogized to the phase of an input signal to a phase lock loop. Referring to FIGS. 5 and 7b, the position comparator function 506 is analogized to a phase detector 750 of a phase lock loop, whereby any difference between the input or intended position and the actual position of rotor 206 is recognized as a "phase error". The phase error is then passed through position compensator function 510 and velocity compensator function 512, which together is analogous to a loop filter 752 in the phase lock loop model, and which further generates the results from function 512 described above to track the position of rotor 206 to the intended position of rotor 206.

In the phase lock loop analytical model, the commutation controller function 514, drive circuit 202, and motor 204 together simulates a VCO 754 of an electronic phase lock loop, while sampling circuit 210, back EMF calculator 502 and flux vector calculator 504 represent the feedback signals provided by a VCO 754 to the phase detector (i.e., position comparator 506) of a phase lock loop. In this analytical model, the output of flux vector calculator function 504 along line 518 may be considered the phase output, while the output along line 520 may be considered the frequency output.

For the embodiment, motor input controller 200 only tracks and closes a loop with respect to the position of rotor 206, as a tracking of actual position to the intended position is generally all that is required in motor applications. It will be appreciated that in other embodiments, a phase lock loop model of analysis may be used for other tracking criteria, such as rotor velocity. In the embodiment, this is made possible by adjusting the parameters of the loop filter to essentially ignore a position error and react only to a velocity error.

By tracking rotor position, any changes in the desired velocity or position of rotor 206, as determined from input signal 212, is tracked as phase or positional discrepancies and corrected for by position comparator 506 in the same manner as a phase detector in an electronic phase lock loop. In this way, the operation of motor input controller 200 in the embodiment would tend to drive the steady state "error" between the intended position and actual position of rotor 206 to zero. By tracking rotor position with a phase locked loop model, motor input controller 200 is able to continually adjust the position of rotor 206 to track the intended position for rotor 206 from input signal 212.

It will be appreciated that for any particular drive circuit 202 and motor 204, there is a maximum level of current (i.e., power) below a threshold cap that may be supplied at any one time to cause rotation of rotor 206. For the embodiment, commutation controller function 514 of motor input controller 200 provides the functionality to limit the control output signals 214 to keep the maximum current at or below a threshold cap level supplied by drive circuit 202 to motor 204. Even though the output of position compensator 510 may request a velocity adjustment, such an adjustment may not be translated into increased current supplied by drive circuit 202 since commutation control function 514 may determine that there is no available current below the threshold cap for making the adjustment.

Advantageously, the continuous tracking of the position of rotor 206 described above permits the embodiment to track the total accumulated error in the position of rotor 206, even when there is no available current below the threshold cap for making a velocity adjustment. By controlling motor 204 based on the total accumulated error, motor input controller 200 avoids the problems of losing position steps that tend to occur even when the motor 204 with maximum current in it windings 302A and 302B. For example, during hard acceleration of rotor 206, drive circuit 202 may not be able to supply, and nor can circuit windings 302A and 302B of motor 204 accept, a level of current (i.e., power) that would cause acceleration of rotor 206 to remain synchronized with the intended position and velocity as provided by input signals 212. This may tend to occur when maximum current is already being supplied to windings 302A and 302B, and commutation controller function 514 would not further adjust its output to further increase the current to be supplied to motor 204, despite the output of velocity compensator function 512 requesting that the current supplied be increased in order to increase the velocity of rotor 206. However, this does not lead to lost positional steps in the embodiment, because position comparator function 510 continually provide adjustments based on the total accumulated position error of rotor 206, motor input controller 200 permits a velocity adjustment to be made at any time when there is available current under the threshold cap for use in providing the adjustment. If rotor 206 is lagging behind the intended position and velocity under hard acceleration or deceleration, the position "lag" is not simply lost even though commutation control function 514 may not be able to immediately adjust the current supplied to circuit windings 302A and 302B to increase velocity of rotor 206. In the embodiment, the position lag is continually tracked as a position error by sampling circuit 210 and motor input controller 200, so that the lag may be made up by the embodiment based on the feedback and adjustment as described above, when there is available current under the threshold cap.

For the embodiment, operation of motor 204 may not in be in phased locked loop, or "closed" loop, at all times. During operation in which rotor 206 is spinning slowly, such as when motor 204 is initially starting up, there may not be enough current sampling points for $i_A$ and $i_B$ across windings 302A and 302B such as to allow for the reliable calculation of the flux vectors $\lambda_{AW}$ and $\lambda_{BW}$. In such situations, motor 204 operates in "open-loop" mode wherein the position of rotor 206 is not "locked" under the phase-locked loop condition described above by motor input controller 200. During open-loop operation, motor input controller 200 still provides calculations of discrete-time back EMF voltages $V_{AW}$ and $V_{BW}$ as described above, and motor input controller 200 provides rotor position estimates based on the back EMF voltage calculation alone, by estimating the position of rotor 206 as the arc-tangent of the ratio of $V_{AW}$ to $V_{BW}$. In open loop operation, motor input controller 200 uses the back EMF voltages $V_{AW}$ and $V_{BW}$ to estimate the position of rotor 206. This estimated position, as predicted by the back EMF voltages, rather than that as predicted by flex vector calculator function 504, is then used to provide the information for calculation by position comparator function 506 and velocity comparator function 508 in motor input controller 200. It will be appreciated that while estimation of rotor position by back EMF voltages rather than by back EMF flux vectors is less accurate because of the smaller signal-to-noise ratio at low speeds, the loss of accuracy is less critical when rotor 206 is rotating at these slower speeds.

Since motor input controller 200 can detect the position of rotor 206 once it is closed loop, or phase-locked loop, mode of operation, it is possible to detect "loss of lock" errors or following error conditions, traditionally known as stalls in an open loop stepper system. This feature may be very advantageous to the users of motor input controller 200. For example, on a multi axis system, if one axis encounters a fault, then the other axes can be commanded to shut down. For safety as well as for process control reasons, this can be very advantageous. In the present embodiment, this error condition is sent out of motor input controller 200 as a digital output signal. Typically, a fault signal is generated if the systems lags or leads the commanded position by more than a user-defined number of steps.

As the velocity of rotor 206 increases above the threshold point where closed-loop operation is possible, the last estimated position of rotor 206 is provided by the host controller to back EMF calculator 502 for use in the calculation of the flux vectors $\lambda_{AW}$ and $\lambda_{BW}$. It will be appreciated that since flux vector calculator function 504 operates essentially as a high pass filter, its output during open loop operation may contain an initial error that has yet to decay inside an acceptable threshold. As such, the embodiment "resets" the integrals for $\lambda_{AW}$ and $\lambda_{BW}$ by setting time n=0 at the transition point from open to closed loop to force the integration constants to known values. At this point, the last estimated position in open loop of rotor 206 is added back to the integrated flux vectors values to allow for a more accurate calculation of the spatial position of rotor 206. The host computer may calculate an estimated position of rotor 206, and adjust the position set-point to be provided to motor input controller 200 via input signals 212 in order to force the output of position calculator function 506 to reflect the position of rotor 206 as predicted by the back EMF voltages, rather than that as predicted by flux vector calculator function 504 in motor input controller 200. As the positional estimate switches from back EMF signals to flux signals, the phase of the position of rotor 206 is made to be continuous and a known, predetermined flux vector of proper magnitude is projected onto the vector produced by the back EMF voltage estimates. As such, at the time of transition to closed loop the torque producing component of the stator current is predicted and used to seed the output of velocity compensator 512. For the embodiment, flux vector calculator 504 operates as a second order high-pass filter of approximately 3 DB with a cut-off frequency at 10 Hz.

If in operation rotor 206 slows down below the threshold speed wherein motor 204 may operate in closed loop, motor input controller 200 will examine the present estimated error in the position of rotor 206. If the error is deemed small enough to be correctable, then motor input controller 200 switches to open loop operation and continues to provide position adjustments to rotor 206 based strictly on back EMF calculations, as explained above. However, if the error in the position of rotor 206 is too large at the time of transition to open loop, then motor input controller 200, in conjunction with the host controller, will force motor 204 into a reset by stopping rotor 206, and then provide an open loop adjustment to rotor 206 so that it rotates to a restart position before resuming rotation whereby its position may be tracked and corrected anew by motor input controller 200. For the embodiment, an error is considered "small enough" if it is within a range of plus or minus forty-five electrical degrees.

It will be appreciated that the threshold speed for switching between open and closed loop operation will depend on the torque rating of a particular motor and the resolution of the circuitry detecting back EMF. An appropriate threshold speed of approximately 60 Hz may be selected for some embodiments. A further factor to consider in stepper motor control when transitioning between open and closed loop operation is to ensure that enough torque is being generated so that rotor 206 may complete its "step" at the transition point so that the step is not lost during the transition to and from closed loop operation.

During operation, as rotor 206 is moving to an intended position under aggressive acceleration or deceleration, it is possible for rotor 206 to continue to spin after it reaches the intended position, and hence "overshoot" the intended position. The period of time for rotor 206 to come to a stop after it passes the intended position may be referred to as the overshoot period, and the positional movement of rotor 206 during this period of time may be referred to as the overshot. This overshot is recognized by motor input controller 200 as an error between the estimated position and the intended position of rotor 206 in the same manner as described above. As rotor 206 slows down and enters open loop operation, the position error at the time of transition is provided to the host controller, and further movement in open loop is also continually tracked in open loop, as described above. In this way, the host controller obtains an estimate of the overshot of rotor 206. After rotor 206 comes to a stop after the overshoot period, the host controller can then use its error tracking information to move rotor 206 in open loop operation back to its intended position by movement equal in magnitude, but in an opposite direction, to the overshot. In a preferred embodiment, motor input controller 200 may further provide further analytical functions to recognize that rotor 206 is approaching an intended position, and begin deceleration of rotor 206 before it passes the intended position to reduce the overshot.

Referring to FIGS. 3 and 9, further detail on sampling circuit 210 is now provided. Sampling circuit 210 may be any circuit known in the art for determining the current flowing through each of windings 302A and 302B and the voltages across each such windings and on the common bus for the windings, as shown in the circuit diagram of FIG. 3. Referring to FIG. 9, as is known in the art, a simple method for determining current flow is to provide a sense resistor, measure the voltage $V_A$ and $V_B$ drop across the sense resistor, and then calculate the current as the ratio of the voltage drop over the resistance of the sense resistor. Such a simple sampling circuit is shown in FIG. 9, wherein sense resistors 902A and 902B are connected to windings 302A and 302B respectively. Additionally, two resistors 904 and 906 are connected in a voltage divider configuration for detecting the bus voltage $V_C$. For the embodiment, only the voltage $V_{R906}$ across resistor 906 of the voltage divider is measured, which is a scaled version of the bus voltage $V_C$. Where resistor 904 has resistance $R_{904}$ and resistor 906 has resistance $R_{906}$, the bus voltage $V_C$ is determined as follows:

$$V_C = V_{R4}\left(\frac{R_{904} + R_{906}}{R_{906}}\right)$$

Discrete time measurement is provided in sample circuit 210 by sample and hold switches 908A, 908B and 908C as is known in the art. For the embodiment, a sampling rate of 50 micro-seconds is used, however, it will be appreciated that other sampling rates may be used in other embodiments. Further, it will be appreciated that in alternate embodiments, other sampling circuits of varying complexity and accuracy may be used, such as the sample and hold circuit described in U.S. Pat. No. 5,874,818 to Scheurman.

Figure 3A:
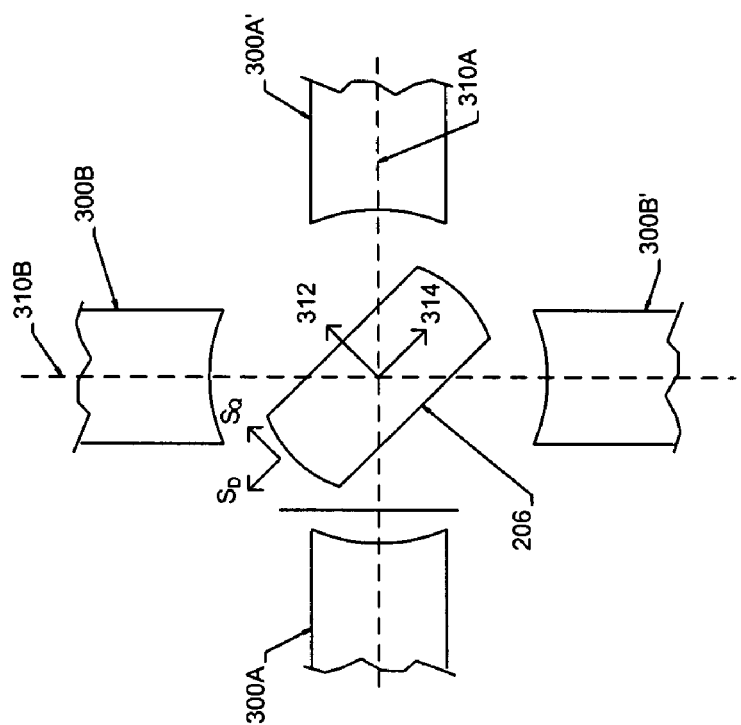
FIG. 3a is an alternate view of components of the motor of FIG. 3.

In the embodiment, commutation control function 514 of motor input controller 200 further optimizes the magnetic field generated by the stators of motor 204. Referring to FIGS. 3 and 3a, depending on the position of rotor 206 at any given time, it will be appreciated that the magnetic field produced within motor 204 by the energization of at least one of windings 302A or 302B will have a quadrature component and a direct component with respect to rotor 206. Quadrature refers to a component of magnetic force that acts in an axis along a direction orthgonal to rotor 206 (the quadrature axis 312) such that it produces a torque force to rotate rotor 206. Direct refers to a component of the magnetic field in an axis along a direction parallel to rotor 206 (the direct axis 314) which produces compression forces upon rotor 206, but does not cause rotor 206 to rotate. As such, the quadrature axis 312 and direct axis 314 are relative to the position of rotor 206, and changes with the rotation of rotor 206. For example, as shown in FIG. 3a, if the magnetic field generated by the stators of motor 204 is represented generally as "S" in a direction towards stator 300B, then there would be, with respect to the position of rotor 206 as shown, a component of the stator magnetic field $S_Q$ which acts in the quadrature axis 312 relative to rotor 206, and a direct component $S_D$ of the stator field which acts in parallel, or along the direct axis 314, to the position of rotor 206. For the purpose of analysis, it will be appreciated that the electric currents provided to windings 302A or 302B may be considered as having a quadrature component and a direct component. As such, a portion of the current supply to each winding 302A and 302B will be used to produce a torque producing (i.e. quadrature) component of magnetic force in the magnetic stator field S, and a portion of the current will produce a useless compressing (i.e. direct) component of force in the overall magnetic field generated by the stators.

In the embodiment, the estimated present position of rotor 206 is continually provided to commutation control function 514, as described above. By utilizing the estimated present position of rotor 206, commutation control function 514 makes further calculations to determine how electrical current should be provided to windings 302A and 302B so as to determing a first commutation adjustment to maximize the quadrature component of a magnetic field to be created in motor 204, and a second commutation adjustment to minimize the direct component of the magnetic field. The commutation adjustments are then used to adjust the current set-points so as to adjust the current control signals, as described above.

At any estimated position θ of rotor 206, where θ is the estimated position of rotor 206 in electrical degrees relative to a fixed reference position, the direct component ($I_D$) and quadrature component ($I_Q$) of current arising from the current in windings 302A ($I_A$) and 302B ($I_B$) may be calculated as follows:

$$\begin{bmatrix} I_D \\ I_Q \end{bmatrix} = \begin{bmatrix} \cos\theta & -\sin\theta \\ \sin\theta & -\cos\theta \end{bmatrix} \begin{bmatrix} I_A \\ I_B \end{bmatrix}$$

By exploiting the relationship between $I_D$ and $I_Q$ to $I_A$ and $I_B$, commutation control 514 may make further calculations to adjust the current set-points for windings 302A and 302B so as to optimize the magnetic field by minimizing the resultant $I_D$ and maximizing the resultant $I_Q$. It will be appreciated that similar mathematical relationships exists for determining $I_D$ and $I_Q$ in other embodiments having more than two circuit windings.

The ability to separately control $I_D$ and $I_Q$ further permits motor input controller 200 to alleviates some effects caused by back EMF on motor 204 by rotor magnetic field weakening. As described above, back EMF contributes to the decline in motor torque as rotor velocity increases. Without rotor magnetic field weakening, back EMF may generally be countered by increasing the power supplied to energize windings 302A and 302B. However, neither voltage nor current can be increased arbitrarily, since the electrical components to drive circuit 202 cannot sustain arbitrarily high voltages. Furthermore, the costs associated with supplying higher power in a circuit increases significantly as output voltage levels increase.

To reduce the generation of back EMF, the embodiment adjusts the direct component of current ($I_D$) provided to circuit windings 302A and 302B to counter the magnetic field produced by rotor 206. For example, in FIG. 3b rotor 206 is shown at an instant in time T as it is rotating in a clockwise direction in the orientation shown. In this example, at time T the direct axis 314 of rotor 206 is aligned with a magnetic axis 310A of stators 300A and 300A', and quadrature axis 312 is aligned to a magnetic axis 310B of stators 300B and 300B'. Therefore, in this simple example at time T the current $I_A$ is equal to $I_D$, and $I_B$ is equal to $I_Q$.

Figure 3B:
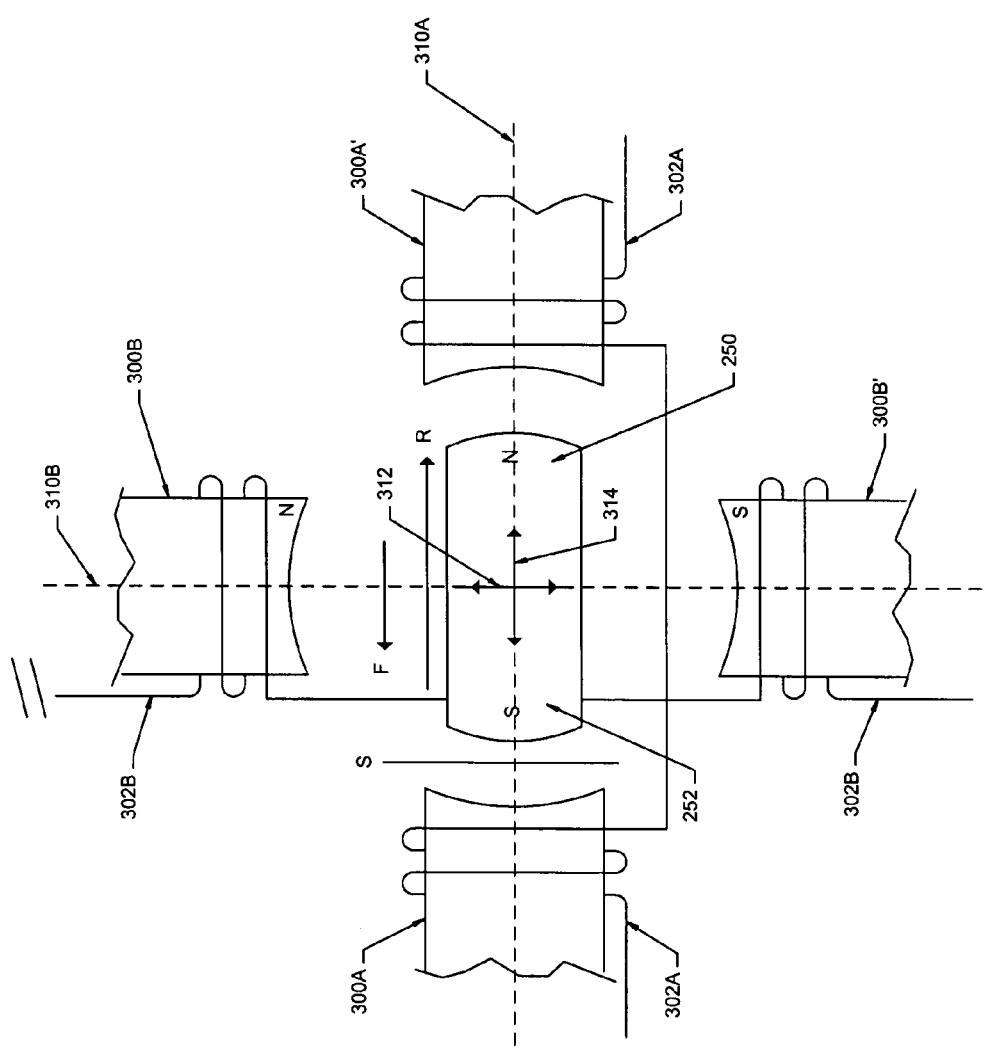
FIG. 3b is a further alternate view of components of the motor of FIG. 3.

It will be appreciated that during typical operation of motor 204, stators 300A, 300A', 300B and 300B' are energized according to a commutation scheme to cause rotation of rotor 206. For ideal torque, only a current $I_Q$ should be provided while the current $I_D$ should be minimized to preferably substantially zero. Therefore, at time T as shown in FIG. 3b, the current $I_B$ flowing through circuit winding 302B should be at its peak value while the current $I_A$ in circuit winding 302A should be zero. As such, a magnetic field S, aligned with magnetic axis 310B and quadrature axis 312, is generated by the stators at time T. As shown, at time T end 250 of rotor 206 (corresponding to magnetic north) is about to rotate pass stator 300A', and end 252 (corresponding to magnetic south) is about to pass stator 300A. As such, at time T the quadrature component of the stator magnetic field S is fully aligned with magnetic axis 310B corresponding to stators 300B and 300B', while the direct component of stator magnetic field S is zero.

Since rotor 206 comprise a permanent magnet with polarized ends 250 and 252, rotor 206 will at all times generate a rotor magnetic field R that shifts in relation to the rotation of rotor 206. The rotation of magnetic field R causes a back EMF to appear across circuit windings 302A and 302B. Furthermore, each of stators 300A, 300A', 300B and 300B' are each effectively an electromagnet as each stator is energized and de-energized to generated the stator magnetic field S. Since stator magnetic field S also rotates during operation of motor 204 as its stators energized and de-energized, magnetic stator field S also causes a back EMF to appear across circuit windings 302A and 302B. At time T shown in FIG. 3b, the rotation of rotor magnetic field R is generating maximum back EMF on circuit winding 302B, while not inducing any back EMF on circuit winding 302A. Additionally, the rotation of stator magnetic field S is generating maximum back EMF on circuit winding 302A, while not inducing any back EMF on circuit winding 302B at time T. The sum of the rotor magnetic field R and stator magnetic field S generates a back EMF magnetic field λ that induces back EMF across circuit windings 302A and 302B.

As described above, the embodiment permits the estimation of the back EMF flux vectors $\lambda_{AW}$ and $\lambda_{BW}$ across each of circuit windings 302A and 302B, which in the aggregate represents an estimate of the back EMF field λ. These back EMF flux vectors $\lambda_{AW}$ and $\lambda_{BW}$ may be converted to be along the quadrature and direct axes 312 and 314, respectively, for further analysis by commutation control function 514:

$$\begin{bmatrix} \lambda_Q \\ \lambda_D \end{bmatrix} = \begin{bmatrix} \cos\theta & -\sin\theta \\ \sin\theta & -\cos\theta \end{bmatrix} \begin{bmatrix} \lambda_{AW} \\ \lambda_{BW} \end{bmatrix}$$

In the preferred embodiment, commutation control 514 of motor input controller 200 provides a further commutation adjustment to adjusts the direct component of current ($I_D$) provided to circuit windings 302A and 302B to counter the back EMF field $\lambda$ by varying the current set-points for $I_A$ and $I_B$ as described above. For example, at time T shown in FIG. 3b, instead of having zero $I_D$ current along the direct axis (that is, zero $I_A$), commutation control 514 adjusts the current set-point for circuit windings 302A 302B such that the current $I_D$ is adjusted with a rotor field weakening current adjustment to produce a rotor weakening field F that is opposite to the component of the back EMF field $\lambda$ along the direct axis 314 of rotor 206, that is, opposite to $\lambda_D$. The total back EMF inducing magnetic field at time T upon circuit winding 302B is the back EMF field $\lambda$ minus the rotor weakening field F. For example, at time T as shown in FIG. 3b, the rotor weakening field F is generated by having some current $I_A$ (which for this example, corresponds directly with $I_D$) adjusted by an rotor field weakening current adjustment as determined by commutation control 514, which causes a current to flow to circuit winding 302A to generate a rotor weakening field F as described above.

As a further advantage, magnetic field optimization and rotor magnetic field weakening allows for minimizing the power required to be provided by drive circuit 202 to cause rotation of rotor 206 by minimizing the power that is lost for generating the direct component of a magnetic field in motor 204. This in turn allows for the utilization of a drive circuit 202 that produces less power, allow a rotor to operate at a higher speeds, or a combination of both. Magnetic field optimization and rotor field weakening also permits greater acceleration of rotor 206.

Figure 8A:
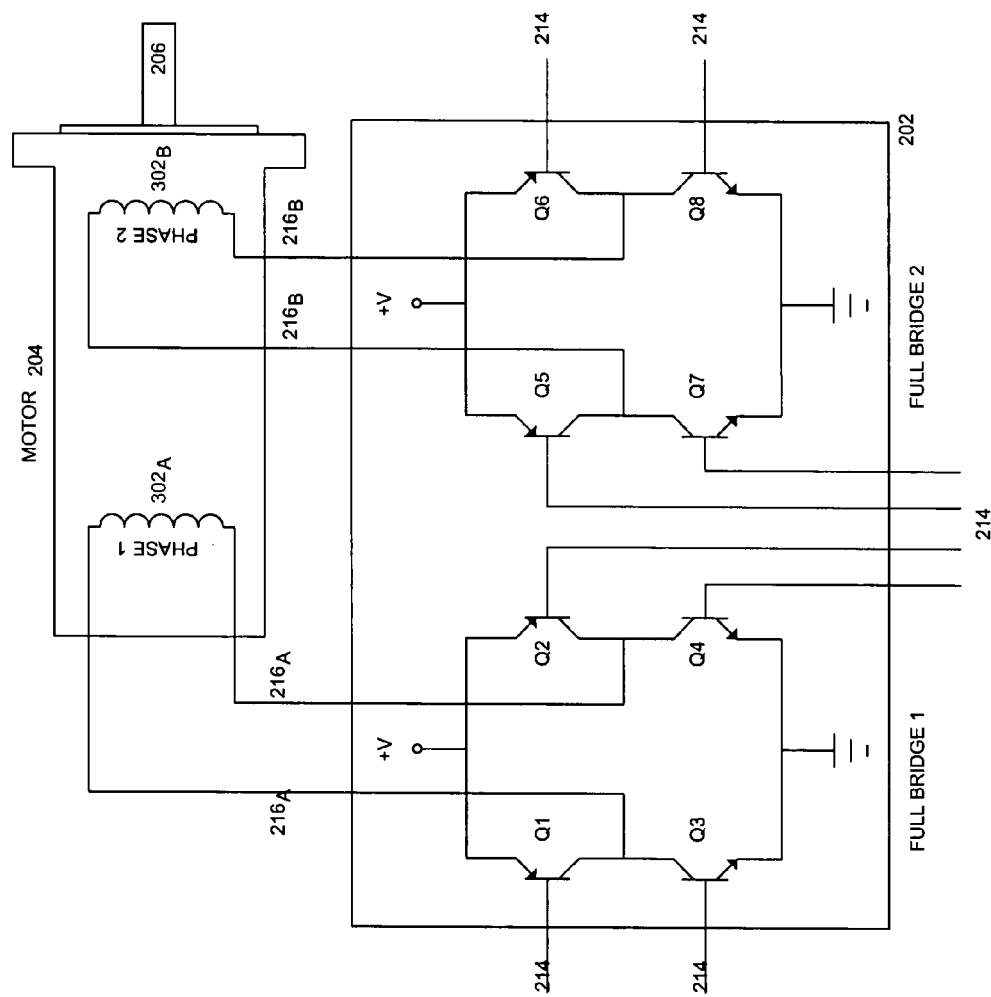
FIG. 8a is a schematic representation of a drive circuit of the motor control scheme of FIG. 2.

Referring to FIG. 8a, an exemplary drive circuit 202 is shown in greater detail. The design of drive circuit 202 shown in FIG. 8a is commonly referred to as twin full bridge drive circuits. A full bridge in this context refers to the use of four transistors arranged as shown as full bridge 1 or full bridge 2, with resistors Q1 to Q4 forming one full bridge, and resistors Q5 to Q8 forming a second full bridge. Control signals 214 from motor controller 200 is provided to drive circuit 202 to drive each of transistors Q1 through Q8 in accordance with the commutation scheme generated by motor input controller 200. The drive current 216 supplied to windings 302A and 302B is supplied separately as 216a and 216b to each winding, respectively. For example, if winding 302A is to be energized, then control signals 214 may simultaneously turn on transistors Q1 and Q4 to provide for a current flow through winding 302A via current 216a, or alternatively control signals 214 can turn on transistors Q2 and Q3 simultaneously to provide a current through winding 302A in a reverse direction.

Figure 8B:
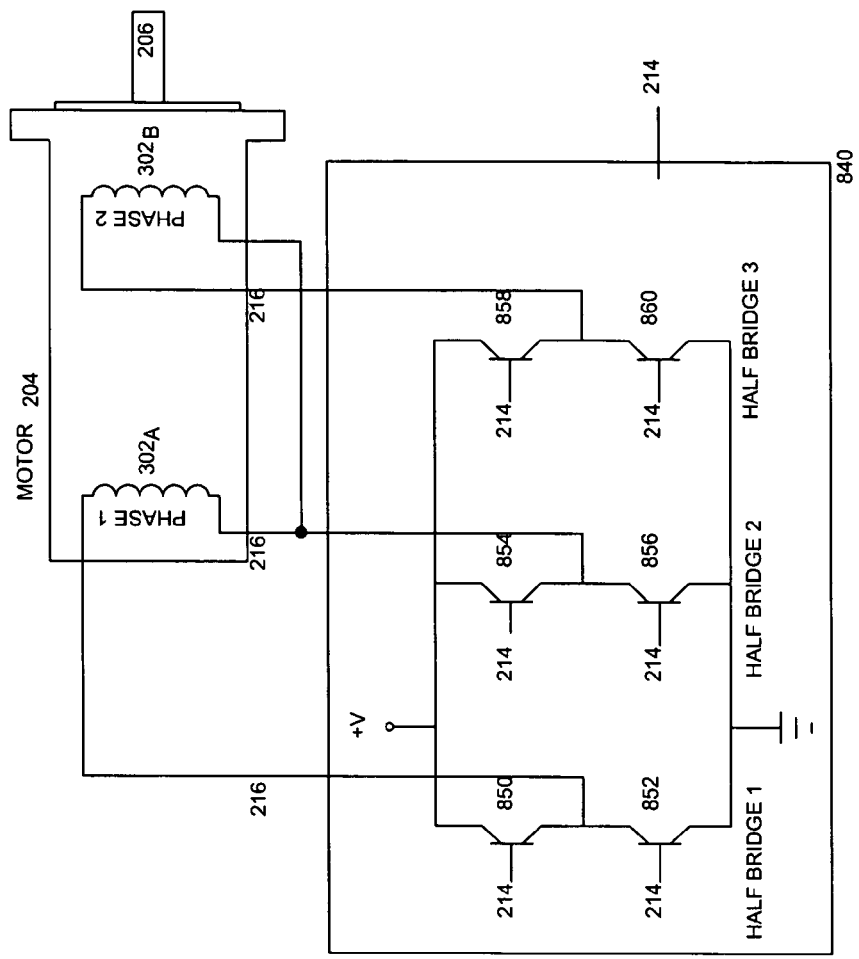
FIG. 8b is a schematic representation of an alternate drive circuit of the motor control scheme of FIG. 2.

In a preferred embodiment, drive circuit 202 would be formed not with two full bridges but with three half bridges, as shown in FIG. 8b. In FIG. 8b, each pair of transistors 850 and 852, 854 and 856, and 858 and 860 forms a half-bridge. Using three half bridges as opposed to two full bridges to form drive circuit 202 to produced drive current 202 reduces the number of electronic components required, which in this example reduces the number of transistors required from eight to six. In the embodiment of FIG. 8b, the half-bridge formed by transistors 854 and 856 is shared between the two phases, and as such this half-bridge is used by both winding 302A and 302B to drive motor 204.

Driving motor 204 with three half bridges as shown in FIG. 8b has a disadvantage in that the voltage applied to each phase of motor 204 is effectively half of what would have been available by using two full bridges. As such, this results in lower usable motor speeds than if two full bridges were utilized with the same power supply. However, in the preferred embodiment, if used in conjunction with the magnetic field optimization control provided by motor input controller 200 as described above, the reduction in the direct component of the magnetic stator field provided within motor 204 compensates for the loss in voltage applied to the windings of motor 204. The preferred embodiment permits the use of three half bridges to operate a motor 204 in applications that may otherwise have required use of twin full bridges in the absence of magnetic field optimization. It will be appreciated that drive circuits of other configurations may be used in other embodiments.

It will be appreciated from the above examples that a myriad of components may be used to implement embodiments of the invention. Further, it will be appreciated that motor control of other permanent magnet or hybrid motors of any number of phases, including three-phase brushless DC motors, may be achieved in other embodiments of the invention.

Although the invention has been described with reference to certain specific embodiments, various modifications thereof will be apparent to those skilled in the art without departing from the spirit and scope of the invention as outlined in the claims appended hereto.

I claim:

1. A method for controlling a rotor of an electric motor, the motor having a plurality of stators and a winding connected to each stator of the plurality of stators, said motor being responsive to electric current provided to a set of windings of the motor causing the rotor to change position, said method comprising:

controlling position of said rotor from a present open loop position to an open loop intended position in an open-loop operation mode, by;

deriving the open loop present position of the rotor from a back electromotive force (EMF) based on at least one of current and voltage conditions of the windings;

determining an electric current to move said rotor from said open loop present position to said open loop intended position;

providing said electric current to said set of windings to move said rotor towards said open loop intended position; and determining a present open loop velocity of said rotor from said at least one of current and voltage conditions;

transitioning control of the motor from the open-loop operation to a phase-locked loop operation when the present rotor velocity reaches a transition velocity; and controlling a subsequent velocity of said rotor via a phase-locked loop operation after said transition velocity is reached, said subsequent velocity determined by a phase-locked position of said rotor and an intended phase-locked position of said rotor, by;

deriving a phase-locked electrical phase for said phase-locked position by;

determining a back EMF flux value induced over each winding connected to each stator of the plurality of stators from said at least one of current and voltage conditions, including;

determining a current back EMF value from said at least one of current and voltabe condition, and integrating values of the current back EMF and previously determined back EMF over each said winding using integration constants with values determined from the back EMF value at the time of transition;

determing a phase error representing the difference between a present electrical phase of said rotor and an intended electrical phase representing said intended phase-locked position; and providing an adjustable phase-locked electric current to said set of winding to move the rotor towards the intended phase-locked position, said current being adjustable to track said phase error to adjust said subsequent velocity.

2. The method according to claim 1, wherein the open loop intended position is derived from one of a plurality of host communication input signals.

3. The method according to claim 2, further comprising, if the subsequent velocity of the rotor falls to the transition velocity:

transitioning control of the motor from the phase-lock operation to the open loop operation to control position of the rotor.

4. The method according to claim 3, wherein said phase-locked loop operation further comprises:

upon generation of a stator magnetic field by magnetizing one or more of the plurality of stators determining at least one energizing winding of said windings to energize for tending to reduce the direct component of said stator magnetic field;

determining at least another energizing winding to energize for tending to increase the quadrature component of said stator magnetic field; and adjusting said phase-locked electric current to provide current to said at least one energizing winding and to said at least another winding for tending to reduce the direct component and in accordance with said determining of windings to energize for tending to increase the quadrature component.

5. The method according to claim 4, wherein said phase-locked loop operation further comprises:

determining a direct component of a back electromotive force field along the direct axis based on said current back EMF induced over each said winding;

determining one or more of said at least one windings to energize for generating a rotor weakening field to oppose the direct component of said current back EMF; and further adjusting said adjustable phase-locked electric current to provide current to said one or more of said at least one windings in accordance with said determining of windings to energize for generating a rotor weakening field.

6. The method according to claim 5, wherein the windings of said motor are connected to a three half-bridges drive circuit.

7. The method according to claim 5, wherein the windings of said motor are connected to a two full-bridges drive circuit.

8. The method according to claim 6, wherein the motor is a stepper motor.

9. The method according to claim 6, wherein the motor is a brushless DC motor.

10. The method according to claim 8, wherein the plurality of host communication input signals are received by a motor controller as an input control signals received from a host computer.

11. The method according to claim 10, wherein the input controls signal comprises one or more pulses, said one or more pulses each specifying a step and direction of intended rotation for said rotor.

12. The method according to claim 11, further comprising providing tracking of said phase error in phase-locked loop operation and providing an alert to the host computer said phase error indicates a stall condition on the rotor.

13. A system for controlling the position of a magnetic rotor of an electric motor, the motor having a plurality of stators for causing rotation of the rotor upon magnetization of at least one stator of the plurality of stators, and a winding connected to said each stator for magnetizing said each stator when electric current flows through the winding, said motor responding to current control signals to adjust electric current flowing through one or more of said windings to cause the rotor to rotate towards an intended position, said system comprising:

a sampling circuit electrically connected to each winding for measuring at least one of the current and voltage on each winding;

a processing circuit in communication with said sampling circuit for determining a present position of the rotor from the at least one of current and voltage on each winding, said processing circuit receiving input control signals based on said input control signals and any difference between the present position and the intended position of the rotor, said processing circuit communicating with said motor to cause an adjustment in the current control signals to cause the rotor to rotate toward the intended position based on the adjusted input control signals;

a control module to selectively control said motor via phase-lock loop operation and open loop operation, wherein said open loop operation derives a present position of the rotor from a back electromotive force (EMF) based on at least one of current and voltage conditions of the windings;

derives a present rotor velocity from said at least one of current and voltage conditions; and adjusts the current control signals to induce movement of the rotor towards an intended position based on the derived present position of the rotor; and said phase-locked loop operation derives a present electrical phase representing said present position of the rotor and an intended electrical phase representing said intended position, said deriving a present electrical phase including determining a back EMF flux value induced over each said winding connected to each stator of the plurality of stators from said at least one of current and voltage conditions, including determining a current back EMF and integrating values of the current back EMF and previously determined back EMF values over each said winding, wherein said integrating includes, at the time of transition, seeding integration constants for said integrating with values determined from the back EMF value at a time of transition between open loop operation and phase-locked loop operation;

determines a phase error representing the difference between the present electrical phase and the intended electrical phase; and adjusts said current control signals to control said electric current to track said phase error to provide movement of the rotor towards the intended position; and said control module selectively engages said open loop operation if the rotor is rotating below a transition velocity of the motor, and said phase-locked loop operation if the rotor is rotating at or above the transition velocity.

14. The system of claim 13, wherein upon generation of a stator magnetic field by magnetizing one or more of the plurality of stators for causing rotation of the rotor, said stator magnetic field having a quadrature component along a quadrature axis and a direct component along a direct axis relative to the present position of the rotor said phase-lock loop module processing circuit further:

determines a first commutation adjustment for energizing one or more of said at least one windings for tending to reduce the direct component of said stator magnetic field;

determines a second commutation adjustment for energizing one or more of said at least one windings to for tending to increase the quadrature component of said stator magnetic field; and further adjusts said current control signals to provide current to said one or more of said at least one windings in accordance with said first and second commutation adjustments.

15. The system of claim 14, wherein said phase-lock loop operation further:

determines a direct component of the current back EMF along the direct axis based on said current back EMF induced over each said winding;

determines a third commutation adjustment for energizing one or more of said at least one windings for generating a rotor weakening field to oppose the direct component of said current back EMF; and further adjusting said current control signals to provide current to said one or more of said at least one windings in accordance with said third commutation adjustment.

16. The system of claims 15, wherein the windings of said motor are connected to a three half-bridges drive circuit.

17. The system of claim 15, wherein the windings of said motor are connected to a two full-bridges drive circuit.

18. The system of claim 16, wherein the motor is a stepper motor.

19. The system of claim 16, wherein the motor is a brushless DC motor.

* * * * *

UNITED STATES PATENT AND TRADEMARK OFFICE
CERTIFICATE OF CORRECTION

| | | |
|---|---|---|
| PATENT NO. | : 7,116,070 B2 | Page 1 of 2 |
| APPLICATION NO. | : 11/181947 | |
| DATED | : October 3, 2006 | |
| INVENTOR(S) | : David Kyle MacKay | |

It is certified that error appears in the above-identified patent and that said Letters Patent is hereby corrected as shown below:

1. Claim 1, column 20, line 35: replace the punctuation ";" with --:--.

2. Claim 1, column 20, line 56: replace the punctuation ";" with --:--.

3. Claim 1, column 20, line 58: replace the punctuation ";" with --:--.

4. Claim 1, column 20, line 62: replace the punctuation ";" with --:--

5. Claim 1, column 20, line 64: replace the word "voltabe" with --voltage--.

6. Claim 1, column 20, line 64: replace the word "condition" with --conditions--.

7. Claim 1, column 21, line 9: replace the word "winding" with --windings--.

8. Claim 3, column 21, lines 20-21: replace the words "phase-lock operation" with --phase-locked loop operation--.

9. Claim 12, column 22, line 9: replace the phrase "host computer said" with --host computer if said--.

10. Claim 13, column 22, line 11: delete the word "the".

11. Claim 13, column 22, line 30: replace the phrase "signals based" with --signals, based--.

UNITED STATES PATENT AND TRADEMARK OFFICE
CERTIFICATE OF CORRECTION

PATENT NO. : 7,116,070 B2
APPLICATION NO. : 11/181947
DATED : October 3, 2006
INVENTOR(S) : David Kyle MacKay It is certified that error appears in the above-identified patent and that said Letters Patent is hereby corrected as shown below:

12. Claim 13, column 22, line 38: replace the phrase "phase-lock loop" with --phase-locked loop--.

13. Claim 13, column 22, line 47: replace the phrase "intended position based" with --intended positions, based--.

Signed and Sealed this

Fifteenth Day of January, 2008

JON W. DUDAS
*Director of the United States Patent and Trademark Office*